(12) United States Patent
Gallant et al.

(10) Patent No.: US 8,537,834 B2
(45) Date of Patent: *Sep. 17, 2013

(54) METHOD OF AND SYSTEM FOR PROVIDING QUALITY OF SERVICE IN IP TELEPHONY

(75) Inventors: John K. Gallant, Plano, TX (US); Steven R. Donovan, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 270 days.

This patent is subject to a terminal disclaimer.

(21) Appl. No.: 13/052,783

(22) Filed: Mar. 21, 2011

(65) Prior Publication Data
US 2011/0170549 A1  Jul. 14, 2011

Related U.S. Application Data

(63) Continuation of application No. 12/789,687, filed on May 28, 2010, now Pat. No. 7,924,849, which is a continuation of application No. 11/553,285, filed on Oct. 26, 2006, now Pat. No. 7,830,891, which is a continuation of application No. 09/370,504, filed on Aug. 9, 1999, now Pat. No. 7,136,387.

(51) Int. Cl.
*H04L 12/28* (2006.01)

(52) U.S. Cl.
USPC ............ 370/395.52; 370/352; 370/395.1

(58) Field of Classification Search
USPC ............ 370/352–358, 385, 395.1, 395.52, 370/401, 465, 466, 467; 379/230
See application file for complete search history.

(56) References Cited

U.S. PATENT DOCUMENTS

| | | |
|---|---|---|
| 5,634,012 A | 5/1997 | Stefik et al. |
| 5,680,116 A | 10/1997 | Hashimoto et al. |
| 5,737,333 A | 4/1998 | Civanlar et al. |
| 5,828,844 A | 10/1998 | Civanlar et al. |
| 5,835,710 A | 11/1998 | Nagami et al. |
| 5,867,571 A | 2/1999 | Borchering |
| 5,883,894 A | 3/1999 | Patel et al. |
| 5,889,777 A | 3/1999 | Miyao et al. |
| 5,903,559 A | 5/1999 | Acharya et al. |
| 5,909,430 A | 6/1999 | Reaves |
| 5,930,348 A | 7/1999 | Regnier et al. |
| 5,933,412 A | 8/1999 | Choudhury et al. |
| 5,953,338 A | 9/1999 | Ma et al. |
| 5,960,416 A | 9/1999 | Block |

(Continued)

OTHER PUBLICATIONS

Barzilai et al., "Design and Implementation of an RSVP-Based Quality of Service Architecture for Integrated Services Internet," 1997, IEEE.

(Continued)

*Primary Examiner* — Phuc Tran

(57) ABSTRACT

A method and system for providing quality of service in an IP telephony session between a calling party and a called party establishes a high quality of service ATM virtual circuit for the session between first and second devices, each of the devices having ATM capability and IP capability. The first and second devices provide bidirectional translation between IP media and ATM media. The system transports IP media for the session between the calling party and the first device, and between said called party and a second device. The virtual circuit transports ATM media for the session between the first and second devices. An intelligent control layer provides IP and ATM signaling to set up the session.

20 Claims, 4 Drawing Sheets

(56) References Cited

U.S. PATENT DOCUMENTS

| | | | |
|---|---|---|---|
| 5,991,292 | A | 11/1999 | Focsaneanu et al. |
| 6,058,113 | A | 5/2000 | Chang |
| 6,073,160 | A | 6/2000 | Grantham et al. |
| 6,081,513 | A | 6/2000 | Roy |
| 6,088,358 | A | 7/2000 | Tomita et al. |
| 6,097,722 | A | 8/2000 | Graham et al. |
| 6,137,777 | A | 10/2000 | Vaid et al. |
| 6,141,686 | A | 10/2000 | Jackowski et al. |
| 6,151,319 | A | 11/2000 | Dommety et al. |
| 6,157,648 | A | 12/2000 | Voit et al. |
| 6,178,169 | B1 | 1/2001 | Hodgkinson et al. |
| 6,185,215 | B1 | 2/2001 | Aho |
| 6,205,148 | B1 | 3/2001 | Takahashi et al. |
| 6,222,842 | B1 | 4/2001 | Sasyan et al. |
| 6,233,234 | B1 | 5/2001 | Curry et al. |
| 6,243,753 | B1 | 6/2001 | Machin et al. |
| 6,252,857 | B1 | 6/2001 | Fendick et al. |
| 6,292,478 | B1 | 9/2001 | Farris |
| 6,349,098 | B1 | 2/2002 | Parruck et al. |
| 6,351,465 | B1 | 2/2002 | Han |
| 6,353,856 | B1 | 3/2002 | Kanemaki |
| 6,366,578 | B1 | 4/2002 | Johnson |
| 6,445,695 | B1 | 9/2002 | Christie, IV |
| 6,507,577 | B1 | 1/2003 | Mauger et al. |
| 6,603,769 | B1 | 8/2003 | Thubert et al. |
| 6,731,642 | B1 | 5/2004 | Borella et al. |
| 6,937,597 | B1 | 8/2005 | Rosenberg et al. |
| 7,099,301 | B1 | 8/2006 | Sheu |
| 7,136,387 | B2 * | 11/2006 | Gallant et al. ............ 370/395.52 |
| 7,830,891 | B2 * | 11/2010 | Gallant et al. ............ 370/395.52 |
| 7,924,849 | B2 * | 4/2011 | Gallant et al. ............ 370/395.52 |
| 2007/0047555 | A1 | 3/2007 | Gallant et al. |

OTHER PUBLICATIONS

Bernet et al., "A Framework for Differentiated Services," Feb. 1999, http://www.ietf.org/internet-draft-ieft-diffserv-framework-02.txt.
Boyle et al., "The COPS (Common Open Policy Service) Protocol," Aug. 1999, http://www.ieft.org/internet-drafts/draft-ieft-rap-cops-07.txt.
Boyle et al., "COPS Usage for RSVP," Jun. 1999, http://www.ieft.org/internet-draft-ieft-diffserv-framework-02.txt.
Braden et al., "Resource ReSerVation Protocol (RSVP): Version I Functional Specification," Sep. 1997, Network Working Group RFC 2205, ftp://ftp.isi.edu/in-notes/rfc2205.txt.
Braun, "Internet Protocols for Multimedia Communications," Oct. 1997, IEEE Multimedia.
Eriksson et al., "SIP Telephony Gateway on DTM," Jul. 2, 1999, Bachelor's Thesis, Royal Institute of Technology, Sweden.
IPHighway Product Overview, http://iphighway.com/prod/, Sep. 22, 1999.
Roberts, "The New Class System: Comprehensive Approaches Give Net Managers the Power to Prioritize . . . ," http://www.data.com/roundups/class_system.html, Oct. 1997.
Rosenberg et al., "Internet Telephony Gateway Location," 1998, IEEE, pp. 488-496.
Schulzrinne et al., "Interaction of Call Setup and Resource Reservation Protocols in Internet Telephony," Jun. 15, 1999, Technical Report.
Schulzrinne et al., "Signaling for Internet Telephony," Feb. 2, 1998, Columbia University, Dept. of Computer Science Technical Report CUCS-005-98.
Schulzrinne, "A Comprehensive Multimedia Control Architecture for the Internet," 1997, IEEE, pp. 65-76.
Sinnreich et al., "Interdomain IP Communications with QoS, Authentication and Usage Reporting," Feb. 2000, Internet Draft.
Sinnreich et al., "AAA Usage for IP Telephony with QoS," Mar. 3, 2000, http://www.fys.ruu.nl~wwwfi/aaaarch/pittsburg/sinnreich/sld001.htm.
Sinnreich et al., "AAA Usage for IP Telephony with QoS," IETF Internet Draft, Jul. 2000.
Wedlund et al., "Mobility Support Using SIP, 1999, Association for Computing Machinery," pp. 76-82.
White, "RXVP and Integrated Services in the Internet: A Tutorial," May 1997, IEEE Communications Magazine.
Wroclawski, "The Use of RSVP with IETF Integrated Services," Sep. 1997, ftp://ftp/isi/edu/in-notes/rfc2210.txt.
Yavatkar et al., "A Framework for Policy-Based Admission Control," Mar. 1999, http://www.ietf.org/internet-drafts/draft-ietf-rap-framework-03.txt.

* cited by examiner

METHOD OF AND SYSTEM FOR PROVIDING QUALITY OF SERVICE IN IP TELEPHONY

RELATED APPLICATIONS

This application is a continuation of U.S. patent application Ser. No. 12/789,687, filed May 28, 2010, which is a continuation of U.S. patent application Ser. No. 11/553,285, filed Oct. 26, 2006 now U.S. Pat. No. 7,830,891, that issued on Nov. 9, 2010), which is a continuation of U.S. patent application Ser. No. 09/370,504 filed Aug. 9, 1999 (U.S. Pat. No. 7,136,387, that issued on Nov. 14, 2006), which are all incorporated by reference herein.

BACKGROUND

The present invention relates generally to the field of Internet telephony, and more particularly, to a method of and system for providing quality of service in an Internet telephony session.

Two trends are currently occurring in the telecommunications marketplace First, telephony services are being added to Internet protocol-based devices. Second, Asynchronous Transfer Mode (ATM) networks are being built with the ability to support user specified quality of service (QoS) on a per connection basis, as part of the ATM switched virtual circuit service capability. Each of these trends have problems. The primary problem with the introduction of telephony services to the IP network is one providing predictable QoS on a per call/connection basis. Although technologies are being developed in the Internet community to address this problem, there is currently no way to guarantee QoS on a per connection basis through an IP network. The primary problem with the second trend is not one of basic service capability, but is rather one of access to the service. Today virtually all desktop devices have access to an IP network through some sort of local area network technology, for example through Ethernet. The problem is that these desktop devices generally do not have access to ATM networks that provide the per call/connection guarantee QoS.

The primary method of addressing QoS in the current IP-BASED networks is to over-provision the amount of bandwidth available in the network. This approach will work as long as the usage of the network stays within the bounds of the available bandwidth. If the usage of the network is not predictable, then it is difficult, for example, to prevent a low priority file transfer from interfering with a connection established to carry real-time voice or video data.

The primary method of providing ATM switched virtual circuit services to devices that do not have native ATM support is to install routers between the IP network and the ATM network that have the ability to generate ATM switched virtual circuits on a per IP flow basis The problems with this approach are: (1) possible destination IP addresses need to be provisioned in the router ahead of time, and (2) it is not possible to define, on an IP flow basis, which IP flow should get the ATM switched virtual circuit service and which should get IP best efforts service. If a destination address is 30 provisioned in the ATM interworking router, then all connections to that destination address will require an ATM switched virtual circuit.

SUMMARY

The present invention provides a method of and a system for providing quality of service in an IP telephony session between a calling party client and a called party client. The system of the present invention establishes a high quality of service ATM virtual circuit for the session between first and second devices, each of the devices having ATM capability and IP capability. The first and second devices provide bidirectional translation between Internet Protocol (IP) media and ATM media. The system transports IP media for the session between the calling party client and the first device, and between the called party client and the second device. The virtual circuit transports ATM media for the session between the first and second devices. An intelligent control layer provides IP and ATM signaling to set up the session In one embodiment of the present invention, the first and second devices include access control managers that are bridges between an IP network and an ATM network. The intelligent control layer assigns a temporary session IP proxy address for the called party at the first access control manager and a temporary session IP proxy address for the calling party at the second access control manager. The system establishes a switched virtual circuit through the ATM network for the session between the first access control manager and the second access control manager by assigning a temporary session calling party number at the first access control manager and a temporary session called party number at the second access control manager.

During the session, the system routes IP media from the calling party to the temporary IP proxy address of the called party at the first access control manager. The first access control manager packages the IP media in ATM cells for transport through the virtual circuit to the second access control manager. The system then routes IP media from the second access control manager to the called party. Similarly, the system routes IP media from the called party to the temporary IP proxy address of the calling party at the second access control manager. The second access control manager packages the IP media in ATM cells for transport through the virtual circuit to the first access control manager. The system then routes IP media from the first access control manager to the calling party.

In an alternative embodiment, the first and second devices include routers that have both IP and ATM capability. The calling party client obtains an authentication ticket and then initiates an IP telephony session with a quality of service request. When the called party client accepts the session, the calling party client initiates setup of a resource reservation protocol IP media session with an ingress router. The ingress router then sets up the IP media session through an egress router to the called party client. When the IP media session is setup, the ingress router sets up an ATM switched virtual connection with the egress router.

DETAILED DESCRIPTION

Figure 1:
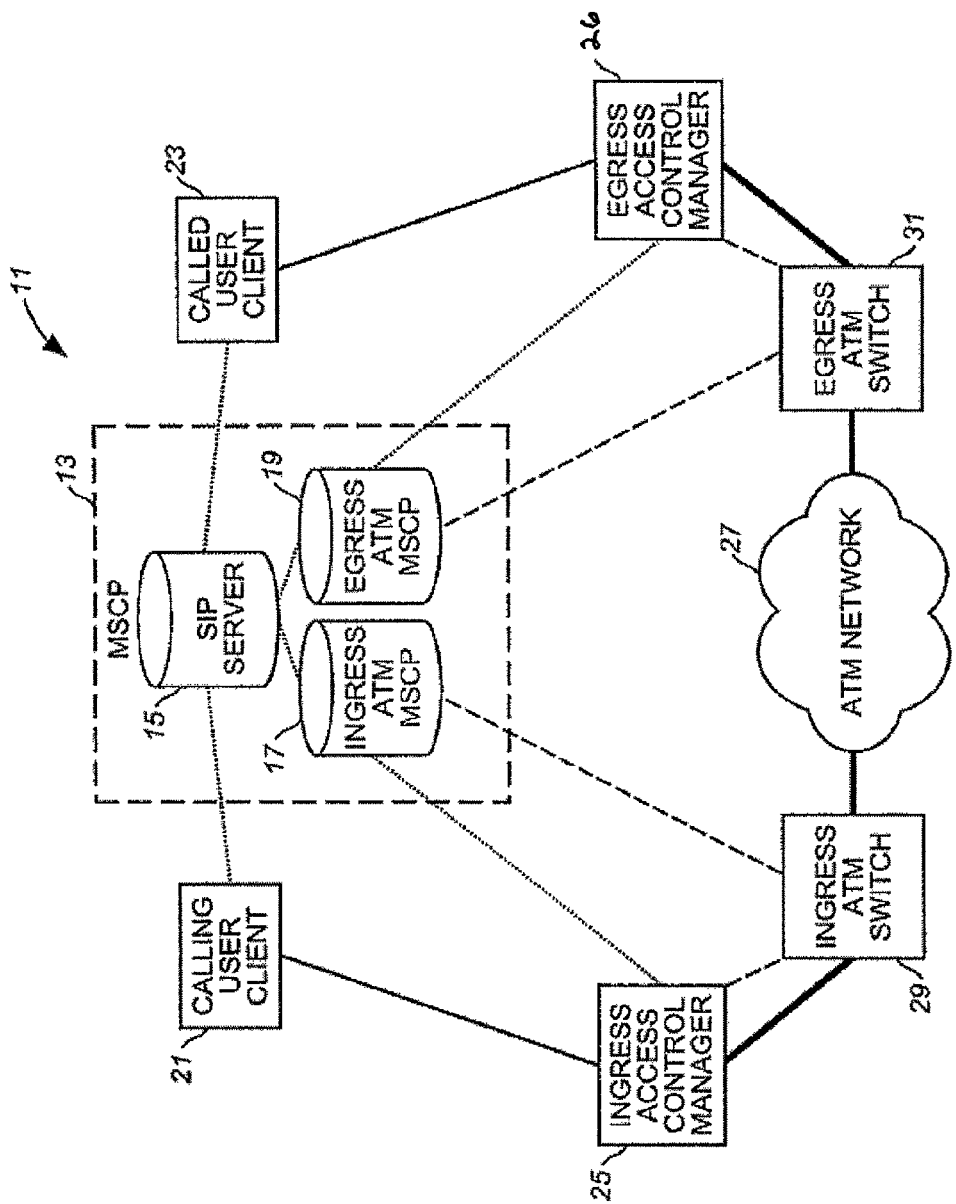
FIG. 1 is a block diagram of a preferred embodiment of the system of the present invention.

Referring now to the drawings, and first to FIG. 1, a system according to a preferred embodiment of the present invention is designated generally by the numeral 11. System 11 includes a media service control point (MSCP) 13. MSCP 13 includes an IP telephony session establishment server, which in the preferred embodiment is a session initiation protocol (SIP) server 15, an ingress Asynchronous Transfer Mode (ATM) MSCP 17, and an egress ATM MSCP 19. As will be explained in detail hereinafter, MSCP 13 provides an intelligent control layer for the establishment of an Internet Protocol (IP) telephony session between a first IP telephony user client 21 and a second IP telephony user client 23.

System 11 includes an ingress access control manager 25 and an egress access control manager 26. Access control managers 25 and 26 provide a media gateway between IP telephony user clients 21 and 23 and an ATM network 27. Ingress access control manager 25 provides an ATM media and signaling interface to an ingress ATM switch 29 of ATM network 27. Similarly, egress access control manager 26 provides an ATM media and signaling interface to an egress ATM switch 31 of ATM network 27.

In FIG. 1, IP signaling paths are indicated with dotted lines and ATM of signaling paths are indicated with dashed lines. IP media paths are indicated with solid lines and ATM media paths are indicated with bold solid lines.

In the embodiment of FIG. 1, a Quality of Service (QoS) connection is provided by routing traffic on the QoS capable backbone provided by ATM network 27. According to the present invention, an ATM connection is created for the IP telephony session between user clients 21 and 23. QoS extensions to the data network applications part (DNAP) protocol perform the signaling between MSCP 13 and access control managers 25 and 26. The access control managers 25 and 26 establish the ATM QoS capable connection. While in the preferred embodiment of present invention, the QoS capable connection is provided by ATM switched virtual circuits, the present invention can also be implemented in a variety of other technologies, such as SONET, and wave division multiplexing.

As will be explained in detail hereinafter, the data path for the session is secured against unauthorized traffic by the use of proxy addressing. The proxy addressing requires translation by the access control managers 25 and 26 to route the media to its intended destination. During session establishment, the addresses of the media stream endpoints are exchanged between user client 21 and user client 23. The signaling message containing the media address of user client 21 is changed to reflect a proxy address, which is an interface at egress access control manager 26. The access control manager interface is assigned on a per session basis. The per session interface uniqueness is accomplished by the allocation and deallocation of ephemeral ports at the access control managers. Associated with the ephemeral ports are the addresses used to create and transit the ATM connection. Likewise, the signaling message containing the media address for user client 23 is changed to reflect a proxy address at ingress access control manager 25.

The system of the present invention dynamically configures QoS connections and ensures their security in two ways. First, the QoS connection is dynamically configured by the use of ATM switched virtual connections. The switched virtual connections are created on a per session basis during call establishment. MSCP 13 invokes the IP to ATM interface mechanisms of access control managers 25 and 26 with DNAP QoS messages. As will be explained in detail hereinafter, access control manager 25 launches a user network interface protocol setup. The ATM traffic sent to and received by access control managers 25 and 26 is intercepted by ATM switches 29 and 31, respectively, and forwarded to their associated ATM MSCPs 17 and 19. The ATM MSCPs create the switched virtual circuit between ATM switches 29 and 31. Access control managers 25 and 26 map the media stream of the session to its switched virtual circuit and the session traffic transits their respective switch virtual circuit.

The second aspect of the real-time configuration solution is the dynamic securing of the access to the connections. This is done by dynamically allocating the proxy addresses during session establishment from a pre-provisioned proxy address pool. The proxy addresses are returned to the user clients 21 and 23 in the signaling messages. The session proxy address mapping is created at the MSCP and communicated to access control managers 25 and 26 by the DNAP protocol. The proxy addresses and the actual session addresses are held at the SIP server 15 and the access control managers 25 and 26 for the duration of the session. When the session is terminated, proxy addresses are deallocated.

Figure 2:
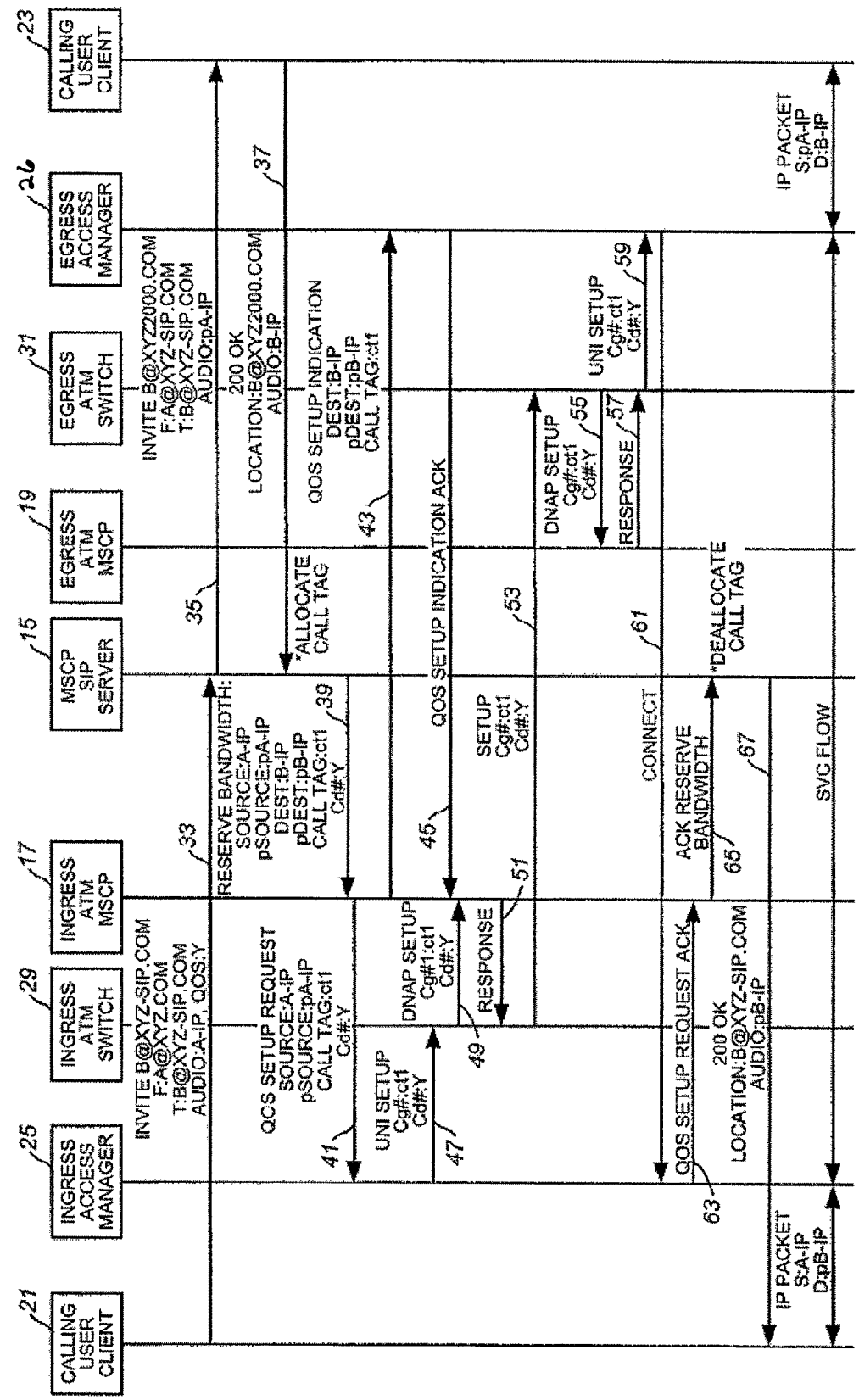
FIG. 2 is a call flow diagram illustrating the signaling and call setup according to the embodiment of FIG. 1.

Referring now to FIG. 2, there is shown a call flow diagram of session initiation according to the embodiment of FIG. 1. User client 21 initiates the session by sending a SIP INVITE message 33 to user client 23. For purposes of illustration, the IP address of user client 21 is A@XYZ.COM. The SIP INVITE is addressed to user client 23 at a proxy address at MSCP SIP server 15, which for purposes to illustration is B@XYZ-SIP.COM. The SIP INVITE specifies the audio source as the real IP address of user client 21, and specifies that QoS is requested. Upon receipt of invite 33, SIP server 15 sends an invite 35 to the real IP address of user client 23, at B@XYZ2000.COM. Invite 35 specifies the audio source as a temporary IP proxy address allocated to user client 21 at egress access control manager 26, which for purposes of illustration is A@ACM-Y.COM. If user client 23 accepts the session, user client 23 sends a 200 OK SIP response 37 back to SIP SERVER 15, specifying an audio destination as its real IP address While in the preferred embodiment, SIP IP telephony signaling is used, other IP signaling protocols, such as H.323 may be used.

Upon receipt of response 37, SIP server 15 allocates a call tag, and sends a reserve bandwidth message 39 to ingress ATh4 MSCP 17. Message 39 specifies the audio destination for the session of as a temporary IP proxy address allocated to user client 23 at ingress access control manager 25. For purposes of illustration, the temporary IP proxy address allocated user client 23 is B@ACM-X.COM. The bandwidth reservation message also identifies the call tag and specifies the called number for the ATM connection as egress access control manager 26.

Upon receipt of bandwidth reservation message 39, ingress ATM MSCP 17 sends a QoS setup request 41 to ingress access control manager 25. Setup request 41 identifies the real source address and proxy source address for user client 21. Setup request 41 also identifies the call tag and the called party number. Ingress ATM MSCP 17 also sends a QoS setup indication message 43 to egress access control manager 26. Setup indication 43 identities the real destination address and proxy destination address for user client 23, as well as the call tag and the called party number for the ATM session. Egress access control manager 27 responds to setup indication 23 with a setup indication acknowledgment 45 back to ingress ATM MSCP 17. Upon receipt of the QoS setup request 41, ingress access control manager 25 sends a user network interface 0 protocol setup message 47 to ingress ATM switch 29. Upon receipt of UNI setup message 47, ingress ATM switch 29 sends a DNAP setup 49 to ingress ATM MSCP 17. When ingress ATM MSCP 17 responds, as indicated at 51, ingress ATM switch 29 sends a setup message 53 to egress ATM switch 31. Upon receipt of setup message 53, egress ATM switch 31 sends a DNAP setup message 55 to egress ATM MSCP 19. When egress ATM MSCP 19 responds, as indicated at 57, egress ATM switch 31 sends a UNI setup message 59 to egress access control manager 26.

Upon receipt of setup message 59, egress access control manager 26 sends a CONNECT message 61 to ingress access control manager 25. Upon receipt of CONNECT message 61, ingress access control manager 25 responds to QoS setup request 41 with a QoS setup request acknowledgment 63 back to ingress ATM MSCP 17. Upon receipt of setup request acknowledgment 61, ingress ATM MSCP 17 responds to the reserve bandwidth message 39 with a reserve bandwidth acknowledgment message 65 back to MSCP SIP server 15. Upon receipt of reserve bandwidth acknowledgment 65, SIP server 15 deallocates the call tag and sends a SIP 200 OK response 67 back to user client 21. The OK response identifies the audio destination as the temporary IP proxy address allocated to user client 23 at ingress access control manager 25. Then, user client 21 sends IP media packets addressed to user client 23 at the temporary proxy address at access control manager 25. Similarly, user client 23 sends IP media packet addressed to user client 21 at the temporary proxy address at egress access control manager 26.

From the foregoing, it may be seen that the embodiment of FIG. 1 provides QoS for IP telephony sessions between IP user clients. Through the use of temporary proxies, user clients 21 and 23 are unaware that their session is carried on an ATM switched virtual circuit. User clients 21 and 23 use standard SIP messaging and standard proxying for call setup and no special intelligence is required on the part of the user clients 21 and 23. An intelligent network layer makes the system of the present invention transparent to user clients 21 and 23.

Figure 3:
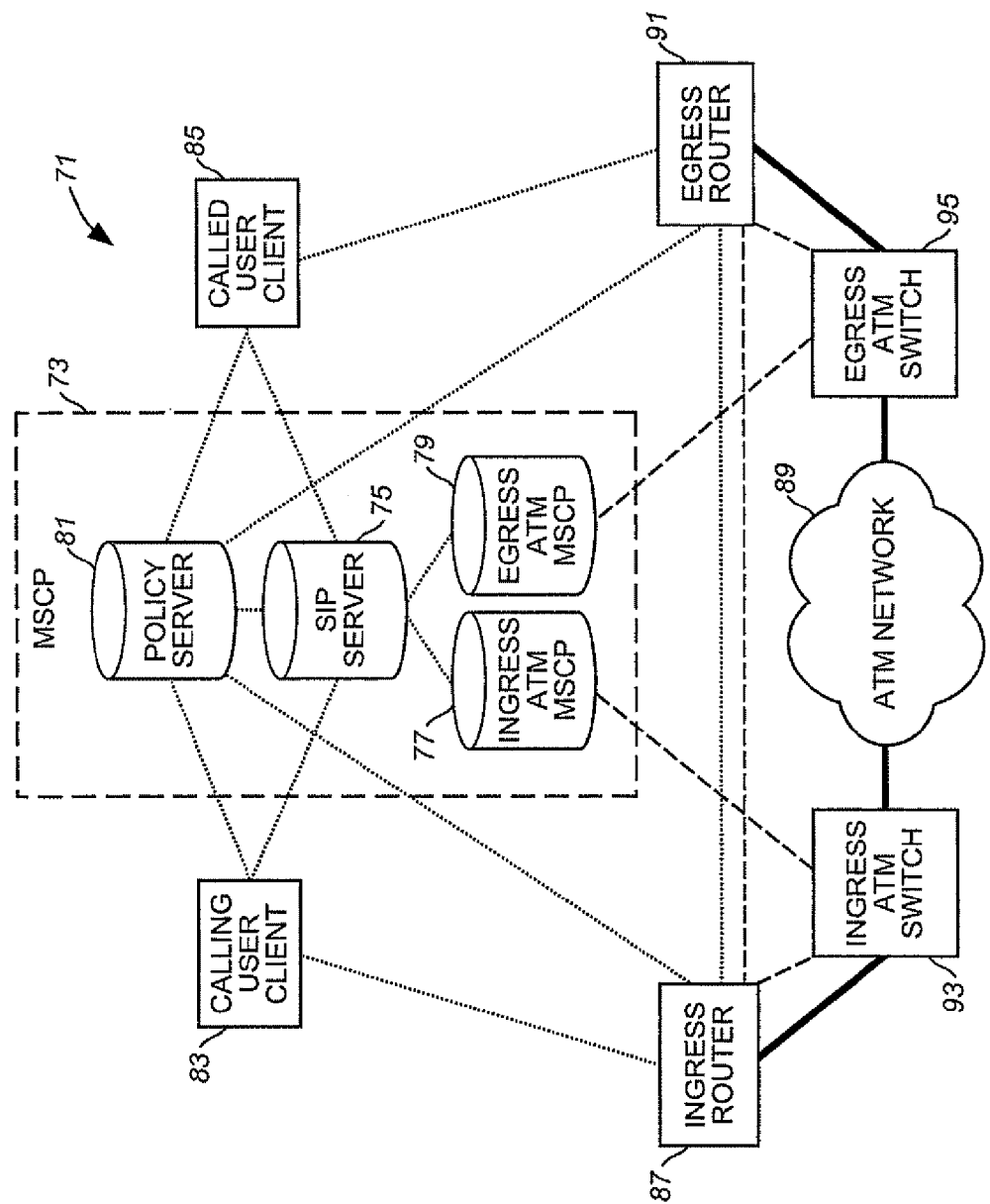
FIG. 3 is a block diagram of an alternative embodiment of the system of the present invention.

Referring now to FIG. 3, an alternative embodiment of the system of the present invention is designated generally by the numeral 71. System 71 includes MSCP indicated generally at 73. MSCP 73 includes an MSCP SIP server 75, an ingress ATM MSCP 77, and an egress ATM MSCP 79. Additionally, MSCP 73 includes a policy server 81. MSCP 73 is adapted to establish a QoS IP telephony session between a calling user client 83 and a called user client 85.

An ingress router 87 provides an interface between IP user client 83 and an ATM network 89. An egress router 91 provides interface between user client 85 and ATM network 89. Ingress router 87 provides an interface to an ingress ATM switch 93 of ATM network 89. Similarly, egress router 91 provides an interface to an egress ATM switch 95 of ATM network 89.

Figure 4:
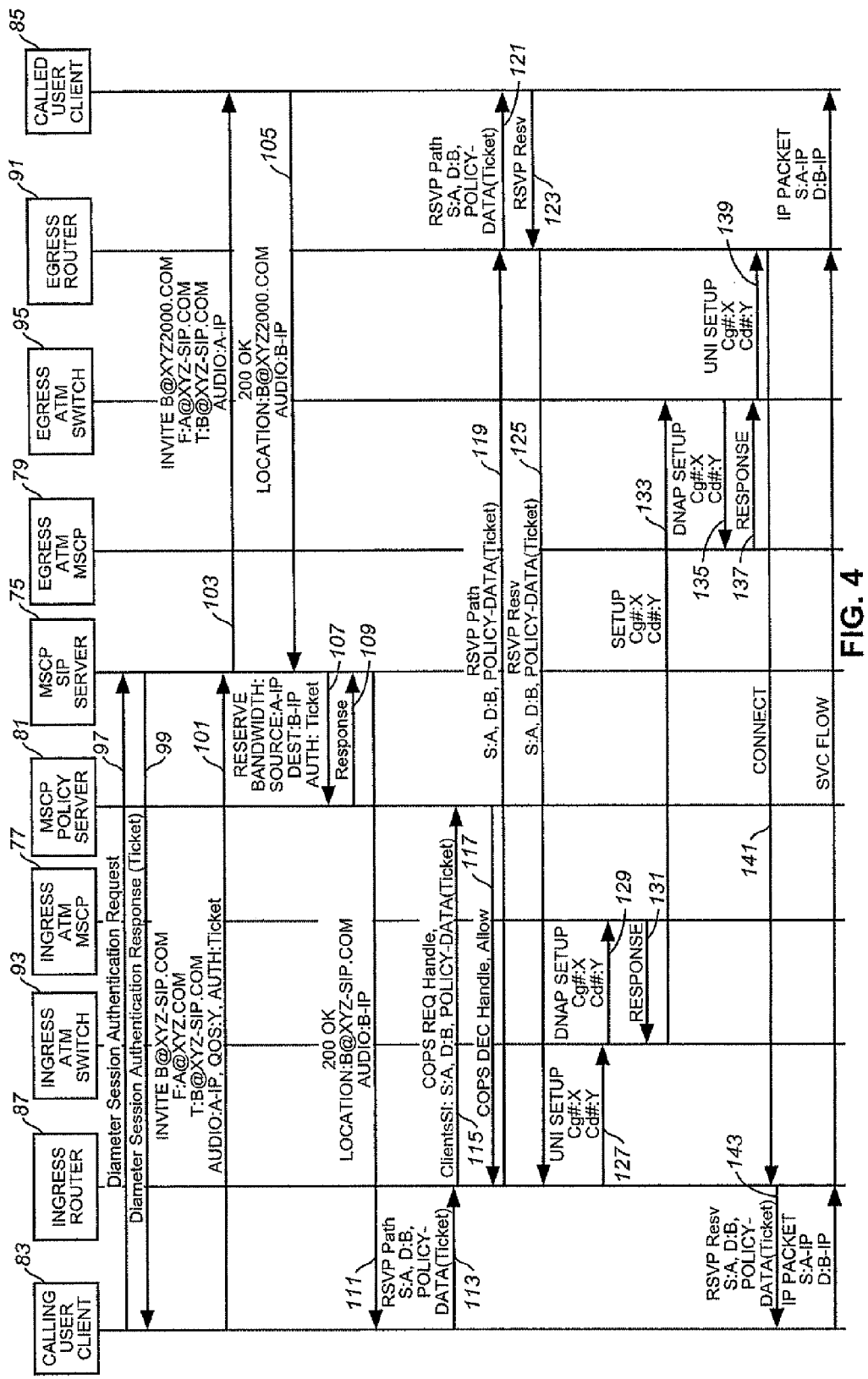
FIG. 4 is a call flow diagram illustrating the signaling and call setup according to the embodiment of FIG. 3.

Referring now to FIG. 4, there is shown a call flow diagram of session initiation according to the embodiment of FIG. 3. User client 83 initiates the session with a Diameter protocol session authentication request 97 addressed to MSCP SIP server 75. Server 75 responds with a Diameter session authentication response (ticket), as indicated at 99. Then, user client 83 sends a SIP INVITE message 101 to user client 85. For purposes of illustration, the IP address of user client 85 is A@XYZ.COM. The SIP INVITE 101 is addressed to user client 85 at a proxy address at MSCP SIP server 75, which for purposes to illustration is B@XYZ-SIP.COM. The SIP INVITE 101 specifies the audio source as the real IP address of user client 83, and specifies that QoS is requested. The SIP INVITE 101 also includes the authentication ticket received in response to Diameter session authentication request 97. Upon receipt of the SIP INVITE 101, SIP server 75 sends an LNVITE 103 to the real IP address of user client 85, at B@XYZ2000.COM. INVITE 103 specifies the audio source as the IP address of user client 83. If user client 85 accepts the session, user client 85 sends a 200 OK SIP response 105 back to SIP Server 75, specifying an audio destination as its real IP address.

Upon receipt of 200 OK SIP response 105, SIP server 75 sends a reserve bandwidth message 107 to MSCP policy server 81. Message 107 specifies the audio source for the session of as the real IP address of user client 83, and the audio destination for the session as the real IP address of user client 85. The message 107 also includes the authentication ticket. Upon receipt of the message 107, MSCP policy server 81 sends a response 109 back to MSCP policy SP server 81. Then, SIP server 75 sends a SIP 200 OK response 111 to user client 83.

Upon receipt of 200 OK response 111, user client 83 sends a resource reservation protocol (RSVP) path message 113 to ingress router 87. Then, ingress router 87 sends a COPS request handle message 115 to MSCP policy server 81. When MSCP policy server 81 responds, as indicated at 117, ingress router 87 sends an RSVP path message 119 to egress router 91. Then, egress router 91 sends an RSVP path message 121 to user client 85. User client 85 responds with an RSVP reservation response 123 back to egress router 91. Egress router 91 then responds with an RSVP reservation response 125 back to ingress router 87.

Upon receipt of response 125, ingress router 87 sends a UNI setup message 127 to ingress ATM switch 93. Upon receipt of UNI setup message 127, ingress ATM switch 93 sends a DNAP setup 129 to ingress ATM MSCP 77. When ingress ATM MSCP 77 responds, as indicated at 131, ingress ATM switch 93 sends a setup message 133 to egress ATM switch 95. Upon receipt of setup message 133, egress ATM switch 95 sends a DNAP setup message 135 to egress ATM MSCP 79. When egress ATM MSCP 79 responds, as indicated at 137, egress ATM switch 95 sends a UNI setup message 139 to egress router 91.

Upon receipt of setup message 139, egress router 91 sends a CONNECT message 141 to ingress router 87. Upon receipt of CONNECT message 141, ingress router 87 responds to RSVP path message 113 with an RSVP reserve response 143 back to user client 83. Then, the IP telephony session is established between user client 83 and user client 85.

The embodiment of FIGS. 3 and 4, distributes a certain amount of system intelligence to user clients 83 and 85. User clients 83 and 85 are responsible for a greater part of call setup than are user clients 21 and 23 of the embodiment of FIGS. 1 and 2. User clients 83 and 85 process signaling in Diameter and RSVP protocols in addition to signaling in SIP protocol.

From the foregoing it may be seen that the present invention overcomes the shortcomings of the prior art. The present invention dynamically establishes and secures QoS IP telephony sessions by routing traffic on a high QoS backbone, which is preferably an ATM backbone. Those skilled in the art will recognize alternative embodiments, given the benefit of this disclosure. Accordingly, the foregoing disclosure is intended for purposes of illustration and not limitation.

What is claimed is:

1. A system comprising:
    a first device,
        the first device having a first assigned temporary Internet Protocol (IP) session proxy destination address for a called party,
        an IP telephony session being between a calling party and the called party,
        the first device being connected between an IP telephony network and an asynchronous transfer mode (ATM) network, and
        the first device to:

receive first IP traffic from the calling party, and
route, to the called party, first ATM traffic that is based on the first IP traffic received from the calling party; and a second device,
the second device having a second assigned temporary Internet Protocol (IP) session proxy destination address for the calling party,
the second device being connected between the IP telephony network and the ATM network, and
the second device to:
receive second IP traffic from the called party, and
route, to the calling party, second ATM traffic that is based on the second IP traffic received from the called party.

2. The system of claim 1,
where the first device provides a bi-directional translation between the first IP traffic received from the calling party and the first ATM traffic routed to the called party; and
where the second device provides a bi-directional translation between the second IP traffic received from the called party and the second ATM traffic routed to the calling party.

3. The system of claim 1, further comprising:
an ingress switch, of the ATM network, which is interfaced with the first device; and
an egress switch, of the ATM network, which is interfaced with the second device.

4. The system of claim 1,
where the first device comprises a first router, and
where the second device comprises a second router.

5. The system of claim 1, further comprising:
an intelligent control layer, interconnecting the calling party and the called party, to:
establish, for the IP telephony session between the calling party and the called party, a virtual circuit through the ATM network.

6. The system of claim 5, where the intelligent control layer includes a session initiated protocol (SIP) server.

7. The system of claim 6, where the intelligent control layer includes a policy server, in communication with the SIP server, to establish the virtual circuit between the first device and the second device.

8. The system of claim 1,
where the first assigned temporary IP session proxy destination address is dynamically assigned from a first pool of temporary IP proxy addresses associated with an interface of the first device, and
where the second assigned temporary IP session proxy destination address is dynamically assigned from a second pool of temporary IP proxy addresses associated with an interface of the second device.

9. The system of claim 1, where the ATM traffic is routed between the first device and the second device via a switched virtual circuit that is based on the first assigned temporary IP session proxy destination address and the second assigned temporary IP session proxy destination address.

10. The system of claim 9, where the switched virtual circuit is based on a quality of service request to the first device and to the second device.

11. A method comprising:
initiating an Internet Protocol (IP) telephony session between a calling party and a called party;
receiving, by a first device that is connected between an IP telephony network and an asynchronous transfer mode (ATM) network, first IP traffic from the calling party,
the first device having a first assigned temporary IP session proxy destination address for the called party,
routing, via the first device, first ATM traffic to the called party,
the first ATM traffic being based on the first IP traffic received from the calling party;
receiving, by a second device that is connected between the IP telephony network and the ATM network, second IP traffic from the called party,
the second device having a second assigned temporary IP session proxy destination address for the calling party; and
routing, via the second device, second ATM traffic to the calling party,
the second ATM traffic being based on the second IP traffic received from the called party.

12. The method of claim 11, further comprising:
bi-directionally translating, via the first device, the first IP traffic received from the calling party and the first ATM traffic associated with the called party; and
bi-directionally translating, via the second device, the second IP traffic received from the called party and the second ATM traffic associated with the calling party.

13. The method of claim 11, further comprising:
interfacing the first device with the ATM network via an ingress switch of the ATM network; and
interfacing the second device with the ATM network via an egress switch of the ATM network.

14. The method of claim 11,
where receiving the first IP traffic from the calling party comprises:
receiving the first IP traffic from the calling party via a router; and
where receiving the second IP traffic from the called party comprises:
receiving the second IP traffic from the called party via a router.

15. The method of claim 11, further comprising:
establishing, for the IP telephony session between the calling party and the called party, a virtual circuit through the ATM network via an intelligent control layer interconnecting the calling party and the called party.

16. The method of claim 15, where the intelligent control layer includes a session initiated protocol (SIP) server.

17. The method of claim 16, where the intelligent control layer includes a policy server, in communication with the SIP server, to establish the virtual circuit between the first device and the second device.

18. The method of claim 11, further comprising:
dynamically assigning the first assigned temporary IP session proxy destination address, for the called party, from a pool of temporary IP proxy addresses associated with an interface of the first device; and
dynamically assigning the second assigned temporary IP session proxy destination address, for the calling party, from a pool of temporary IP proxy addresses associated with an interface of the second device.

19. The method of claim 11, further comprising:
routing the first ATM traffic between the first device and the second device via a switched virtual circuit that is based on the first assigned temporary IP session proxy destination address and the second assigned temporary IP session proxy destination address.

20. The method of claim 19, where the switched virtual circuit is based on a quality of service request to the first device and to the second device.

* * * * *